United States Patent
Moser et al.

(10) Patent No.: US 6,819,262 B2
(45) Date of Patent: Nov. 16, 2004

(54) PARKING INDICATION SIGN FOR VEHICLES FOR DISABLED PERSONS

(76) Inventors: Georg Moser, Lehrer-Wirth-Strasse 14/III, 81829 Munich (DE); Josef Moser, Schulweg 11, 93462 Lam (DE)

( * ) Notice: Subject to any disclaimer, the term of this patent is extended or adjusted under 35 U.S.C. 154(b) by 0 days.

(21) Appl. No.: 10/333,042

(22) PCT Filed: Jul. 16, 2001

(86) PCT No.: PCT/EP01/08198
§ 371 (c)(1),
(2), (4) Date: Jan. 15, 2003

(87) PCT Pub. No.: WO02/06084
PCT Pub. Date: Jan. 24, 2002

(65) Prior Publication Data
US 2003/0141968 A1 Jul. 31, 2003

(30) Foreign Application Priority Data
Jul. 19, 2000 (DE) .......................................... 100 35 053

(51) Int. Cl.⁷ ................................................ G08G 1/14
(52) U.S. Cl. .................... 340/932.2; 340/903; 340/463; 340/825.19; 340/435; 340/436; 340/691.1; 340/691.6
(58) Field of Search ............................ 340/932.2, 903, 340/463, 825.19, 435, 436, 691.1, 691.6

(56) References Cited
U.S. PATENT DOCUMENTS

| | | | |
|---|---|---|---|
| 4,897,630 A | | 1/1990 | Nykerk |
| 5,334,969 A | * | 8/1994 | Abe et al. .............. 340/426.26 |
| 5,629,690 A | * | 5/1997 | Knoll .......................... 340/904 |
| 5,734,336 A | * | 3/1998 | Smithline .................... 340/903 |
| 6,018,308 A | * | 1/2000 | Shirai ........................... 342/70 |
| 6,163,252 A | * | 12/2000 | Nishiwaki .................... 340/435 |
| 6,300,870 B1 | * | 10/2001 | Nelson ........................ 340/468 |
| 6,661,349 B1 | * | 12/2003 | Kuruvilla et al. ........ 340/691.6 |

FOREIGN PATENT DOCUMENTS

| | | |
|---|---|---|
| DE | 296 15 687 U1 | 12/1996 |
| DE | 195 37 619 C2 | 4/1997 |
| DE | 297 20 654 U1 | 2/1998 |
| DE | 197 25 209 A1 | 12/1998 |
| FR | 2 690 885 A1 | 11/1993 |
| WO | WO 91/05682 A1 | 5/1991 |

OTHER PUBLICATIONS

Patent Abstracts of Japan, vol. 1999, No. 13, Nov. 30, 1999.

* cited by examiner

*Primary Examiner*—Daniel J. Wu
*Assistant Examiner*—Samuel J. Walk
(74) *Attorney, Agent, or Firm*—Caesar, Rivise, Bernstein, Cohen & Pokotilow, Ltd.

(57) ABSTRACT

In an indication device for a motor vehicle used by a disabled person, in particular a person in a wheelchair, with the indication device including an illuminated sign which displays information that for parking of vehicles, sufficient space should be maintained to the entry door of the motor vehicle, at least one distance sensor or movement detector is fitted to the motor vehicle, such that vehicles which are parking too near are registered by distance measuring, and subsequently, illumination of the sign and an acoustic signal transmitter are activated for a specified period of time.

6 Claims, 1 Drawing Sheet

US 6,819,262 B2

PARKING INDICATION SIGN FOR VEHICLES FOR DISABLED PERSONS

BACKGROUND OF THE INVENTION

The invention relates to an indication device for a motor vehicle used by a disabled person.

The widely used wheelchair driver symbol is used to safeguard against others parking too near to the entry door of vehicles used by disabled persons. While the symbol is visible in daylight, it is still often overlooked because it is not sufficiently conspicuous, and in the dark it is hardly noticeable at all. The problem is thus predominantly one of lack of perception, as a result of which it is often made impossible for persons in a wheelchair to get into their vehicle independently.

In this context it is known from DE 296 15 687 U1 and DE 297 20 654 U1 as well as the French published application no. 2 690 885 to clip a laterally protruding arm comprising a sign onto the lateral window and affix this arm by closing the window. This arm protrudes from the vehicle by the same distance as is taken up when the door is opened for the disabled person to get into his/her vehicle. Furthermore, it is known from DE 197 25 209 A1 to provide a parking disc display which when the vehicle is locked automatically displays the parking commencement time. In this arrangement, the display field can automatically display a note, for example an icon denoting a disabled person. Finally, from DE 195 37 619 C2 it is known to provide rearward distance sensors on a motor vehicle which register the approach, for example, of a bicycle from behind, and which automatically cause a warning to be issued not to open the doors, or even cause opening of the doors to be blocked.

It is the object of the present invention to provide an automatic indication device for adequate parking distance, with said device not requiring any components that protrude from the vehicle.

SUMMARY OF THE INVENTION

Accordingly, the invention provides an indication device for a first motor vehicle used by a disabled person, said device comprising:

a sign affixed to the first motor vehicle and adapted to display information intended to dissuade an other motorist from parking a second motor vehicle adjacent to a door of the first motor vehicle;

an acoustic signal transmitter affixed to the first motor vehicle;

at least one detector affixed to the first motor vehicle and adapted to detect a presence of the second motor vehicle adjacent to the door of the first motor vehicle, wherein the at least one detector is adapted to generate a signal upon detecting the second motor vehicle; and communication means for communicating the signal from the at least one detector to the sign and the acoustic signal transmitter, prompting the sign to illuminate and display the information and the acoustic signal transmitter to emit an audible warning intended to dissuade the other motorist from parking the second motor vehicle adjacent to the door of the first motor vehicle.

In certain embodiments, the at least one detector comprises at least one distance sensor and/or at least one movement detector.

In certain embodiments, two coupled detectors are affixed to the first motor vehicle at a distance from each other sufficient to minimize simultaneous signal generation by the two detectors in response to adjacent objects smaller than a motor vehicle.

In certain embodiments, the acoustic signal transmitter is a loudspeaker.

In certain embodiments, the communication means comprises at least one electrically conductive cable.

In certain embodiments, the communication means comprises wireless transmitters and wireless receivers.

DETAILED DESCRIPTION OF THE INVENTION

Figure 1:
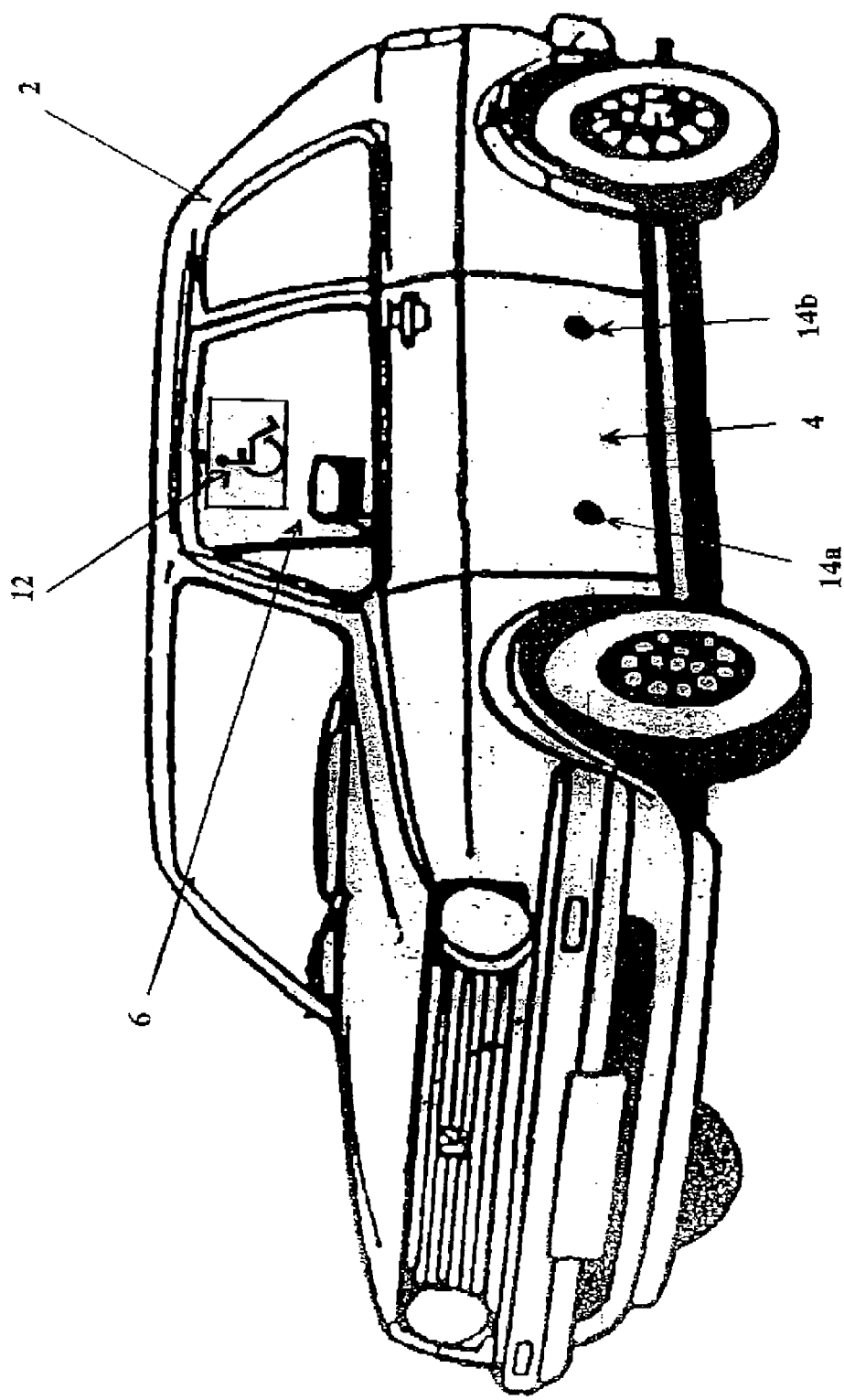
FIG. 1 shows an embodiment of the device of the invention affixed to an automobile.

By means of sensors such as ultrasound or movement sensors, the device according to the invention, which is affixed to the vehicle used by the disabled person, registers a vehicle which is parking too near and by way of a connection to the lighting system of the sign and to an acoustic signal generator activates both these devices for a set period of time.

Lighting which is displayed during close parking is very conspicuous at night. The signal sound is above all used for support during daylight, because it is clearly audible over the short distance by the person leaving the parked car.

In a special embodiment of the invention, two ultrasound sensors, known from park distance control devices, are fitted to the entry door of the vehicle used by a disabled person, with said sensors being spaced apart by 70 cm. They are set so that if a vehicle parks alongside the vehicle used by the disabled person at a distance which is less than the width of the door, a signal is displayed via a cable on the sign affixed in the interior of the vehicle to the side window. By means of a time setting, the sign can for example light up or blink for one minute. Such information can also be supported by a gong sound which is audible from the outside, and which is transmitted by a loudspeaker fitted to the sign or fitted on (in) the vehicle.

In the preferred embodiment with two sensors spaced apart from each other, superfluous triggering of signals by pedestrians walking past can be prevented, because the sensors are coupled and the signal is triggered only if both sensors respond.

As used herein, the expression "affixed to the first motor vehicle" encompasses direct and/or indirect, permanent and/or temporary attachment of the object in question to the inside or outside of the first motor vehicle. For example, an acoustic signal transmitter affixed to the first motor vehicle can be affixed to a sign affixed to the first motor vehicle or affixed on (or in) the first motor vehicle, as noted above.

While the invention has been described in detail and with reference to specific examples thereof, it will be apparent to one skilled in the art that various changes and modifications can be made therein without departing from the spirit and scope thereof.

FIG. 1 illustrates a preferred embodiment of the invention affixed to automobile 2. FIG. 1 shows automobile 2 from the left side, which is the driver side. The automobile is provided with an indication device 12, which is normally deactivated. Indication device is visible throut window 6 of door 4. FIG. 1 also shows two sensors 14a and 14b, mounted at the door and being operable to cause indication device 12 to illuminate when the sensors detect an obstacle appearing within a predetermined distance from door 4. In FIG. 1, indication device 12 displays a warning (e.g., the wheelchair driver symbol as shown) to maintain a distance from the driver side of automobile 2 more than the width of door 4.

What is claimed is:

1. An indication device for a first motor vehicle used by a disabled person, said device comprising:

a sign affixed to the first motor vehicle and adapted to display information intended to dissuade an other motorist from parking a second motor vehicle adjacent to a door of the first motor vehicle;

an acoustic signal transmitter affixed to the first motor vehicle;

at least one detector affixed to the first motor vehicle and adapted to detect a presence of the second motor vehicle adjacent to the door of the first motor vehicle, wherein the at least one detector is adapted to generate a signal upon detecting the second motor vehicle; and communication means for communicating the signal from the at least one detector to the sign and the acoustic signal transmitter, prompting the sign to illuminate and display the information and the acoustic signal transmitter to emit an audible warning intended to dissuade the other motorist from parking the second motor vehicle adjacent to the door of the first motor vehicle.

2. The device according to claim 1, wherein the at least one detector comprises at least one distance sensor and/or at least one movement detector.

3. The device according to claim 2, wherein two coupled detectors are affixed to the first motor vehicle at a distance from each other sufficient to minimize simultaneous signal generation by the two detectors in response to adjacent objects smaller than a motor vehicle.

4. The device according to claim 1, wherein the acoustic signal transmitter is a loudspeaker.

5. The device according to claim 1, wherein the communication means comprises at least one electrically conductive cable.

6. The device according to claim 5, wherein the communication means comprises wireless transmitters and wireless receivers.

* * * * *